US008522241B1

(12) United States Patent
Vohra et al.

(10) Patent No.: US 8,522,241 B1
(45) Date of Patent: Aug. 27, 2013

(54) SYSTEMS AND METHODS FOR AUTO-BALANCING OF THROUGHPUT IN A REAL-TIME EVENT-DRIVEN SYSTEM

(75) Inventors: Anuj Vohra, Johns Creek, GA (US); Nikhil Sarathi, Cumming, GA (US); Marty Smith, Alpharetta, GA (US)

(73) Assignee: McKesson Financial Holdings Limited (BM)

( * ) Notice: Subject to any disclaimer, the term of this patent is extended or adjusted under 35 U.S.C. 154(b) by 414 days.

(21) Appl. No.: 12/893,693

(22) Filed: Sep. 29, 2010

(51) Int. Cl.
G06F 9/46 (2006.01)
G06F 15/16 (2006.01)
G06F 15/173 (2006.01)

(52) U.S. Cl.
USPC ........... 718/100; 718/104; 718/105; 709/201; 709/225; 709/226

(58) Field of Classification Search
USPC ............ 718/1–106; 709/201–207, 223–226; 719/311–318
See application file for complete search history.

(56) References Cited

U.S. PATENT DOCUMENTS

| | | | |
|---|---|---|---|
| 5,892,818 A | 4/1999 | Lee | |
| 6,456,624 B1 | 9/2002 | Eccles et al. | |
| 7,114,158 B1 * | 9/2006 | Thompson et al. | 718/106 |
| 7,489,628 B2 * | 2/2009 | Pirbhai et al. | 370/229 |
| 8,327,020 B1 | 12/2012 | Sarathi et al. | |
| 8,429,448 B1 | 4/2013 | Vohra et al. | |
| 2002/0035606 A1 * | 3/2002 | Kenton | 709/206 |
| 2003/0009560 A1 * | 1/2003 | Venkitaraman et al. | 709/226 |
| 2004/0199926 A1 * | 10/2004 | Gilgen et al. | 719/318 |
| 2005/0188107 A1 | 8/2005 | Piercey et al. | |
| 2005/0249497 A1 * | 11/2005 | Haran et al. | 398/58 |
| 2005/0288964 A1 | 12/2005 | Lutzen et al. | |
| 2011/0040810 A1 * | 2/2011 | Kaplan et al. | 707/822 |
| 2011/0247003 A1 * | 10/2011 | Fong et al. | 718/104 |
| 2012/0060062 A1 | 3/2012 | Lin et al. | |
| 2012/0060165 A1 | 3/2012 | Clarke | |

OTHER PUBLICATIONS

Matt Welsh; SEDA: An Architecture for WellConditioned, Scalable Internet Services; ACM 2001; 13 pages.*
Matt Welsh; The Staged Event-Driven Architecture for Highly-Concurrent Server Applications; Qualifying Examination Proposal, Nov. 2000; 20 pages.*
Non-Final Office Action for U.S. Appl. No. 12/893,546 mailed Aug. 1, 2012.
Notice of Allowance for U.S. Appl. No. 12/893,546 mailed Oct. 11, 2012.
Notice of Allowance for U.S. Appl. No. 12/965,511 mailed Feb. 26, 2013.

* cited by examiner

*Primary Examiner* — Abdullah Al Kawsar
(74) *Attorney, Agent, or Firm* — Sutherland Asbill & Brennan LLP

(57) ABSTRACT

Systems and methods are provided for auto-balancing of throughput in a real-time event-driven system. The systems and methods may include identifying a plurality of processing stages for a real-time event-driven system that receives a system-level event and provides a system-level output, wherein processing stages between a first processing stage and a last processing stage are arranged in a sequential order such that a respective output of an earlier processing stage is provided to a respective request queue of a later processing stage; determining a respective number of requests in each request queue of the plurality of processing stages; comparing the respective determined number of requests to at least one threshold to determine that at least one processing stage is over-utilized, and for the at least one processing stage that is determined to be over-utilized, increasing an allocation of hardware resources to the respective over-utilized processing stage.

20 Claims, 6 Drawing Sheets

SYSTEMS AND METHODS FOR AUTO-BALANCING OF THROUGHPUT IN A REAL-TIME EVENT-DRIVEN SYSTEM

FIELD OF THE INVENTION

Aspects of the invention relate generally to auto-balancing of throughput, and more specifically, to auto-balancing of throughput in a real-time event driven system comprising a plurality of processing stages.

BACKGROUND OF THE INVENTION

Current real-time systems can be designed in multiple stages that are invoked based on event-based transactions that flow through the system. Due to different processing requirements of various stages, which may change over time, there may be mismatches in processing capabilities or throughput across the various stages. As such, the "weak link" phenomenon kicks in, and the throughput of the entire system can fall to the throughput of the slowest stage. Additionally, the requests start queuing up in front of the slowest stage, either filling up the request queue in a perpetually loaded system or causing a multitude of otherwise valid business requests to be denied.

Thus, there is an opportunity for systems and methods for auto-balancing of throughput in a real-time event-driven system.

SUMMARY OF THE INVENTION

Some or all of the above needs and/or problems may be addressed by certain embodiments of the invention. Systems and methods may involve monitoring the hardware parameters (e.g., request queue or other resource utilization such as processor/memory utilization) of the various processing stages of an event-driven system. Based upon the monitoring, the hardware resource allocation (e.g., processing threads or instances) or processing power of a slower stage can be increased, at least until hardware processing reaches an established threshold. Alternatively, the hardware resource allocation or processing power of a faster stage can be decreased, at least until hardware processing reaches an established threshold. The monitoring and auto-balancing of the processing stages can help prevent requests from building up in an asynchronous communication channel (e.g., a request queue of a processing stage) under a heavy load. In an example embodiment, a heavy load can be any transaction volume more than what the slowest processing stage can process in real-time. By increasing the processing power by allocating more processing threads to a slower processing stage, or by creating more instances of the slower processing stage, the system throughput may be increased, thereby reducing the chances that valid requests will be rejected based upon system unavailability. The system may continue to monitor the next slower stage and balance that stage with the rest of the system and so on. This example process may increase efficiency of the hardware resource usage. The example process may monitor the hardware resource usage and will stop creating threads for various stages or additional instances of these stages once the system hardware resource usage increases beyond a specified threshold. Likewise, the process can remove threads or instances for the faster stages as well, such that the removed resources can be available for slower stages as necessary. It will be appreciated that the monitoring and auto-balancing of the processing stages can occur automatically, thereby ensuring that the processing stages run optimally even when the processing logic of the processing stages changes over time, when any additional processing stages are added, or when any processing stages are removed.

In one embodiment, there is a computer-implemented method. The method may include: identifying a plurality of processing stages for a real-time event-driven system that receives a system-level event and provides a system-level output, wherein each processing stage includes a respective request queue for requests to be processed by the respective processing stage, wherein a first of the plurality of processing stages receives the system-level event in its respective request queue, wherein a last of the plurality of processing stages provides the system-level output, wherein stages between the first processing stage and the last processing stage are arranged in a sequential order such that a respective output of an earlier processing stage is provided to a respective request queue of a later processing stage; determining a respective number of requests in each request queue of the plurality of processing stages; comparing the respective determined number of requests to at least one threshold to determine that at least one processing stage is over-utilized, and for the at least one processing stage that is determined to be over-utilized, increasing an allocation of hardware resources to the respective over-utilized processing stage. It will be appreciated that one or more of the prior steps may be performed by executing computer-executable instructions of a module by a computer associated with the event-driven system.

In accordance with another embodiment of the invention, there is a system. The system may include at least one memory operable to store computer-executable instructions, and at least one processor configured to access the at least one memory. The at least one processor may be further configured to execute the computer-executable instructions to: identify a plurality of processing stages for a real-time event-driven system that receives a system-level event and provides a system-level output, wherein each processing stage includes a respective request queue for requests to be processed by the respective processing stage, wherein a first of the plurality of processing stages receives the system-level event in its respective request queue, wherein a last of the plurality of processing stages provides the system-level output, wherein stages between the first processing stage and the last processing stage are arranged in a sequential order such that a respective output of an earlier processing stage is provided to a respective request queue of a later processing stage; determine a respective number of requests in each request queue of the plurality of processing stages; compare the respective determined number of requests to at least one threshold to determine that at least one processing stage is over-utilized, and for the at least one processing stage that is determined to be over-utilized, increase an allocation of hardware resources to the respective over-utilized processing stage.

BRIEF DESCRIPTION OF THE DRAWINGS

Reference will now be made to the accompanying drawings, which are not necessarily drawn to scale, and wherein.

DETAILED DESCRIPTION

Figure 1A:
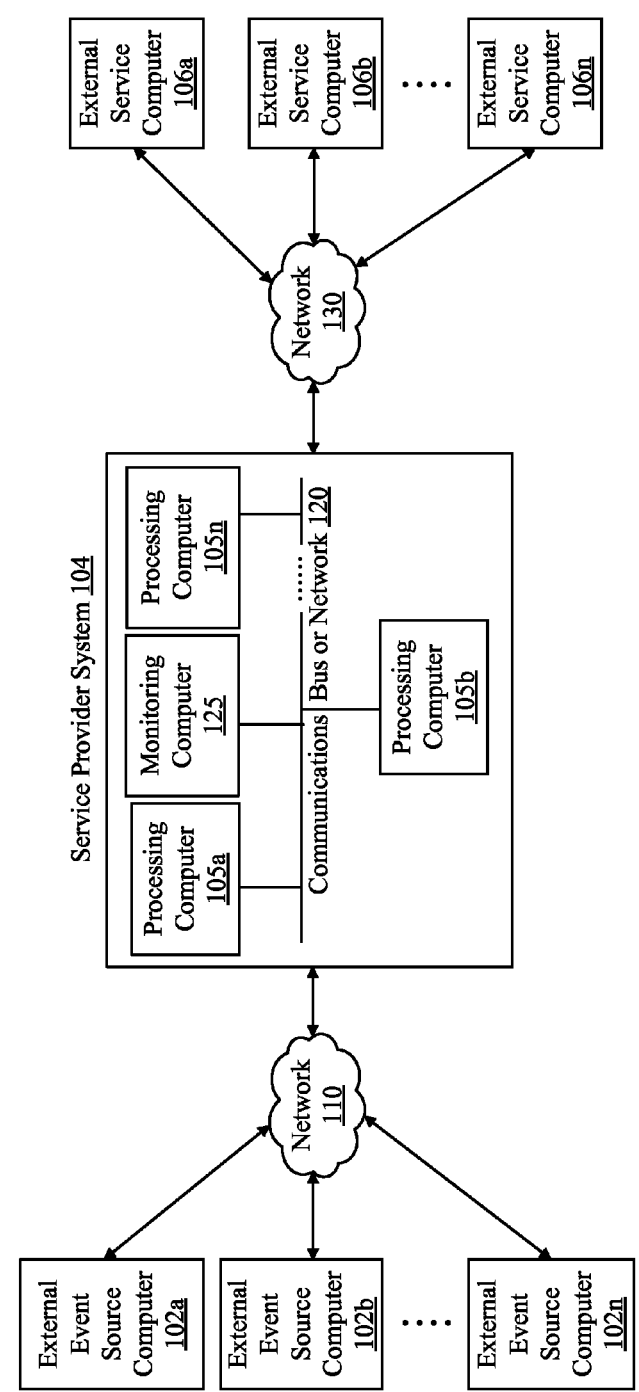
FIG. 1A illustrates an example a real-time event-driven system that supporting auto-balancing of throughput, according to an example embodiment of the invention.

Example embodiments of invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may be directed to systems and methods for auto-balancing of throughput in a real-time, event-driven system. An example event-driven system may include a plurality of processing stages, which may be arranged in one or more sequential orders, according to an example embodiment of the invention. Each processing stage may include a respective request queue that holds requests until the processing stage has sufficient processing capability to retrieve and process the next request in the queue. In an example sequential order, a later processing stage may dependent upon the processing output of an earlier processing stage.

In an example embodiment of the invention, the event-driven system may receive a transaction request from an external event source computer. The event-driven system may deliver the transaction request to the request queue of the first of the plurality of processing stages. The delivery of the transaction request into the request queue may be an "event" that triggers or results in the first processing stage processing the transaction request, and delivering its output to the request queue for a next processing stage. Any number of processing stages may be present between the first processing stage and the last processing stage. As such, the output of one stage is provided to the request queue of the next processing stage for processing as a respective event. When the last processing stage is reached, the output of the last processing stage may be communicated to one or more external services computers as a system-level output.

One or more of the plurality of processing stages of the real-time event-driven system may be monitored to determine any under-utilized or over-utilized processing stages. The monitoring of the processing stages may include comparing the hardware resource utilization (e.g., based upon queue length, processing time, memory usage, etc.) of a processing stage to one or more thresholds. For example, if a particular processing stage has a hardware resource utilization that is less than a threshold, while the remaining processing stages have hardware resource utilizations that are greater than the threshold, then the particular processing stage may be characterized as under-utilized. On the other hand, if another particular processing stage has a hardware resource utilization that is greater than a threshold, while the remaining processing stages have hardware resource utilizations that are less than the threshold, then the particular processing stage may be characterized as over-utilized. Many methods for determining under-utilized and over-utilized processing stages are available without departing from example embodiments of the invention.

To provide for auto-balancing of the throughput provided by the plurality of processing stages, allocations of hardware resources can be adjusted for under-utilized or over-utilized processing stages. For example, the processing power or allocation of hardware resources can be decreased for an under-utilized processing stage, such as by reducing the number of processing threads or processing instances provided for the under-utilized processing stage. On the other hand, the processing power or allocation of hardware resources can be increased for an under-utilized processing stage, such as by increasing the number of processing threads or processing instances provided for the under-utilized processing stage.

It will be appreciated that the monitoring to determine over-utilized or under-utilized processing stages can occur automatically such that processing power or hardware resource allocation can be automatically modified in a dynamic manner over time. For example, as the logic or functionality of processing stages are modified over time, one or more processing stages can become over-utilized or under-utilized. Similarly, as one or more processing stages are added or removed, one or more processing stages can likewise become over-utilized or under-utilized. However, the system can automatically identify these over-utilized or under-utilized processing stages, and automatically make adjustments in the processing power or hardware resource allocation to correct any imbalance in the under-utilized or over-utilized stages.

System Overview

FIG. 1A illustrates an example real-time, event-driven system 100 that supports auto-balancing of throughput, according to an example embodiment of the invention. As shown in FIG. 1A, the system 100 may include an external event source computer 102*a-n*, a service provider system 104, and/or an external service computer 106*a-n*, which are each configured for accessing and reading associated computer-readable media having stored thereon data and/or computer-executable instructions for implementing the various methods described herein. Generally, network devices and systems, including the one or more external event source computer 102*a-n*, service provider systems 104, and external service computes 106*a-n* have hardware and/or software for transmitting and receiving data and/or computer-executable instructions over a communications link and at least one memory for storing data and/or computer-executable instructions. These network devices and systems may also include one or more processors for processing data and executing computer-executable instructions, as well as other internal and peripheral components that are well known in the art. As used herein, the term "computer-readable medium" may describe any form of computer memory or memory device.

As shown in FIG. 1A, the external event source computer 102*a-n* may communicate with the service provider system 104 via network 110, and the service provider system 104 may communicate with the external service computer 106*a-n* via network 130. In an example embodiment, each of the networks 110, 130 may include one or more separate or shared private and/or public networks, including the Internet. The networks 110, 130 can also be the same network as well without departing from example embodiments of the invention. Each of these components—the external event source computer 102*a-n*, the service provider system 104, the external service computer 106*a-n*, and the networks 110, 130—will now be discussed in further detail.

First, the external event source computer 102*a-n* may be associated with any source entity from which the service provider system 104 receives one or more transaction requests that triggers event-based transaction processing by the service provider system 104. In an example embodiment of the invention, the transaction requests may be associated with healthcare transactions such as eligibility requests, pre-authorization requests, claim status requests, and the like. For healthcare transactions, the external event source computer 102*a-n* may be associated with or operated by a pharmacy, a physician, a clinic/hospital, or yet another healthcare provider. It will be appreciated that the source entity can be virtually any entity from which the service provider system 104 receives one or more transaction requests (e.g., for real-time processing or routing) by the service provider system 104, according to an example embodiment of the invention.

Figure 1B:
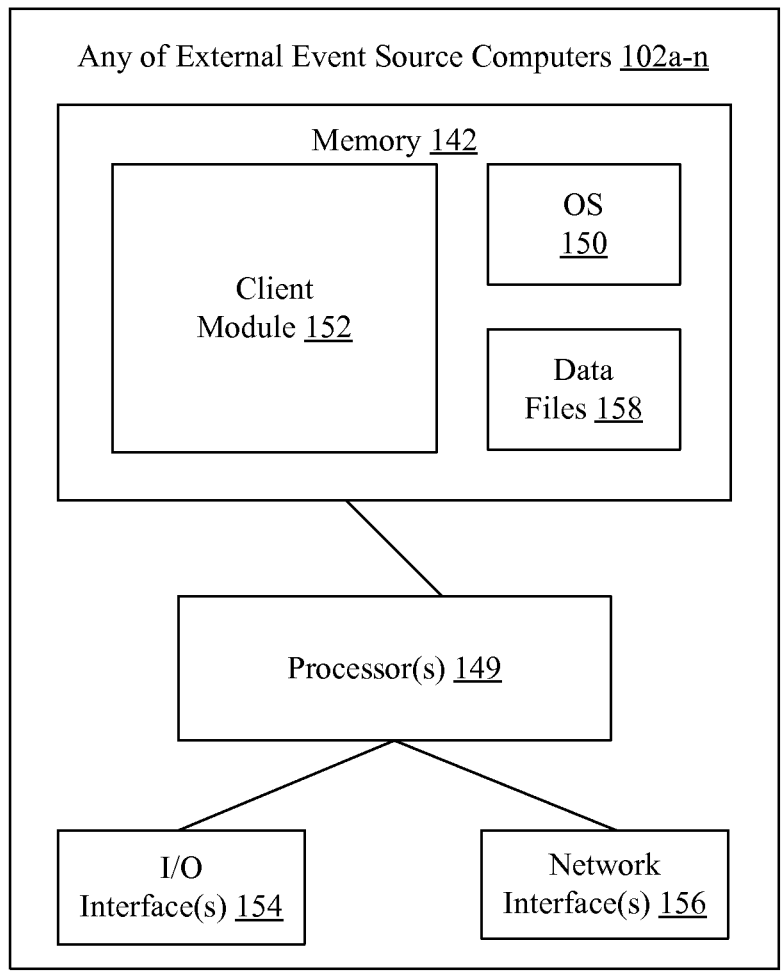
FIG. 1B illustrates an example implementation for an external event source computer, according to an example embodiment of the invention.

FIG. 1B illustrates an example implementation for an external event source computer 102*a-n*, according to an example embodiment of the invention. As shown in FIG. 1B, an example external event source computer 102*a-n* may be any processor-driven device, such as, but not limited to, a server computer, a mainframe computer, one or more networked computers, a desktop computer, a personal computer, a laptop computer, a mobile computer, a handheld portable computer, a digital assistant, a personal digital assistant, a digital tablet, an Internet appliance, or any other processor-based device. In addition to having processor(s) 149, an example external event source computer 102*a-n* may further include at least one memory 142, input/output ("I/O") interface(s) 154, and network interface(s) 156. The memory 142 may be any computer-readable medium, coupled to the processor(s) 149, such as RAM, ROM, and/or a removable storage device for storing data files 158 and a database management system ("DBMS") to facilitate management of data files 158 and other data stored in the memory 142 and/or stored in separate databases. The memory 142 may also store various program modules, such as an operating system ("OS") 150 and a client module 152. The OS 150 may be, but is not limited to, Microsoft Windows®, Apple OSX™, Linux, Unix, or a mainframe operating system. The client module 152 may be an Internet browser or other software, including a dedicated program, for interacting with the service provider system 104.

For example, a user such as a physician, physician assistant, or other healthcare provider employee may utilize the client module 152 to initiate or direct a healthcare transaction request (e.g., eligibility request, claim status request, referral/preauthorization request, medical claim request, etc.) to the service provider system 104 for routing to an external service computer 106*a-n* for processing, where the external service computer 106*a-n* may be a claims processor computer, an insurance company computer, a government-payor affiliated computer, a third-party payor computer, and the like. Likewise, the client module 152 may be used to receive data and/or healthcare transaction responses from the service provider system 104 or external service computer 106*a-n*. Similarly, a user such as a pharmacist or pharmacy employee may utilize the client module 152 to initiate or direct a healthcare transaction request (e.g., eligibility request, claim status request, preauthorization request, prescription claim request, etc.) to the service provider system 104 for routing to an external service computer 106*a-n* for processing, where the external service computer 106*a-n* may be a pharmacy benefits manager (PBM) computer, an insurance company computer, a government payor-affiliated computer, another third-party payor computer, or a claims processor computer, according to an example embodiment of the invention.

Second, the service provider system 104 may include one or more processing computers 105*a-n*, each of which may include, but are not limited to, any processor-driven device that is configured for receiving, processing, and fulfilling requests and responses from an external event source computer 102*a-n* or an external service computer 106*a-n*. One or more of the processing computers 105*a-n* may operate as gateway/routing computers as an interface between networks 110, 130 and the communications bus or network 120, according to an example embodiment of the invention.

One or more of the processing computers 105*a-n* of the service provider system 104 may include, but are not limited to, a server computer, a mainframe computer, one or more networked computers, or any other processor-based device. According to an example embodiment of the invention, a processing computer 105*a-n* may comprise, but is not limited to, one or more "switches" or "switch providers" performing routing and processing (e.g., pre- and post-routing editing) of transaction requests and/or responses between an external event source computer 102*a-n* and an external service computer 106*a-n*. In an example embodiment of the invention, the processing computers 105*a-n* may be coupled to or networked by a communications bus or network 120, according to an example embodiment of the invention. In this manner, when a transaction request is received by the external event source computer 102*a-n*, the service provider system 104 may determine which processing computer 105*a-n* may process the request and communicate with an external service computer 106*a-n* as necessary. To determine which processing system 105*a-n* should process a request, the service provider system 104 may also include one or more monitoring computers 125 coupled to or networked by the communications bus or network 120. The one or more monitoring computers 125 may monitor processing/hardware resource utilization and/or availability of each processing computer 105*a-n*, to determine whether any processing computers 105*a-n* are being under-utilized or over-utilized. By redirecting requests from over-utilized processing computers 105*a-n* to under-utilized processing computers 105, a desired load balancing can be achieved across the plurality of the processing computers 105*a-n* of the service provider system 104. It will be appreciated that the monitoring computer 125 may likewise have a memory and one or more processors that execute computer-executable instructions from the memory, as substantially similar to that described below with respect to FIG. 1C.

Figure 1C:
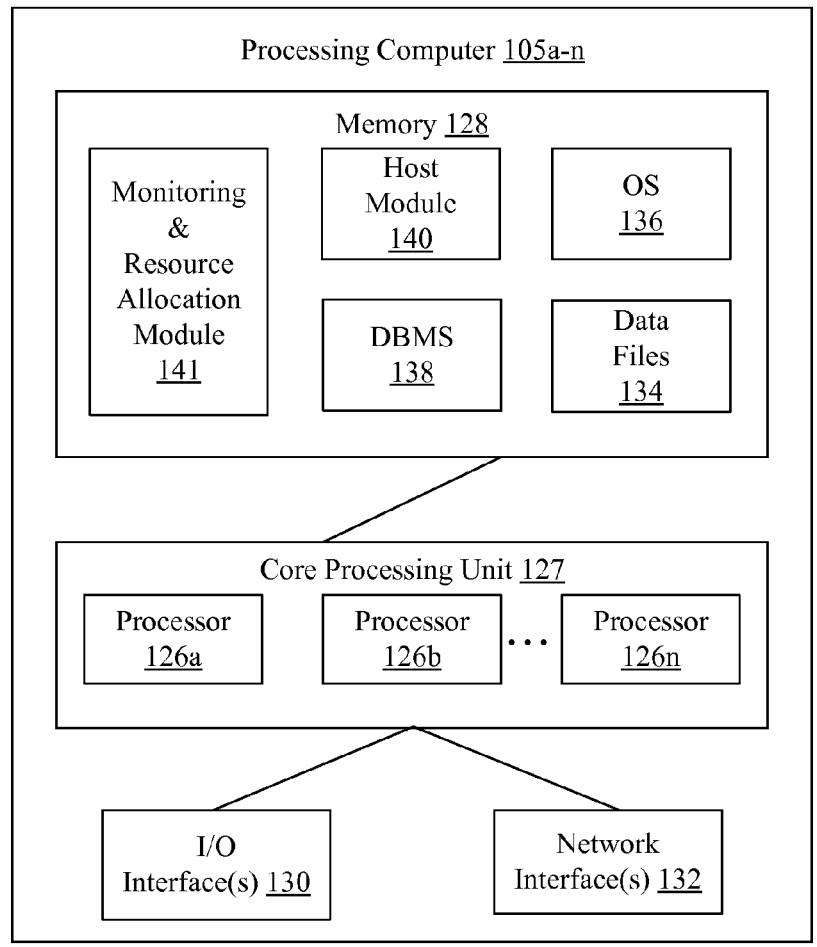
FIG. 1C illustrates an example implementation of a processing computer of a service provider system, according to an example embodiment of the invention.

FIG. 1C illustrates an example implementation of a processing computer 106*a-n* of a service provider system 128, according to an example embodiment of the invention. An example processing computer 105*a-n* may include a core processing unit 127 having one or more processors 126*a-n*. The processing computer 105*a-n* may also include at least one memory 128, input/output ("I/O") interface(s) 130, and network interface(s) 132. The memory 128 may be any computer-readable medium, coupled to the processor(s) 126, such as RAM, ROM, and/or a removable storage device for storing data files 134 and a database management system ("DBMS") 138 to facilitate management of data files 134 and other data stored in the memory 128 and/or stored in one or more databases. The data files 134 may also store routing tables for determining the destination of communications received from the external event source computer 102*a-n* and/or the external service computer 106*a-n*. The memory 128 may also store various program modules, such as an operating system ("OS") 136 and the host module 140. The OS 136 may be, but is not limited to, Microsoft Windows®, Apple OSX™, Linux, Unix, or a mainframe operating system. The host module 140 may receive, process, and respond to requests from the client module 152 of the external event source computer 102a-n, and may further receive, process, and respond to requests from the respective host module 172 of the external service computer 106a-n or the alternate route computer 108, respectively. In this regard, the memory 128 of the service provider system 104 may also include one or more queues, including input queues to receive requests for processing and output queues providing results of processed requests. The queues may also operationally be part of an asynchronous communications channel, according to an example embodiment of the invention.

It will be appreciated that each processing computer 105a-n may operate as a respective real-time, event-driven system, according to an example embodiment. In this regard, each processing computer 105a-n may include a respective plurality of processing stages arranged in one or more sequential orders, as described herein (see, e.g., FIG. 2). The memory 128 of a processing computer 105a-n may also include a monitoring & resource allocation module 141. The monitoring & resource allocation module 141 may be operative to auto-balance throughput in the real-time event-driven system, as will be discussed in further detail with respect to the example process of FIG. 3. In an example embodiment, the monitoring & resource allocation module 141 may be configured to monitor the processing power or hardware resource utilization (e.g., queue length, processor utilization, and/or memory utilization) of one or more of the processing stages of a processing computer 105a-n. Based at least in part on the monitored processing power or hardware resource utilization, the monitoring & resource allocation module 141 may determine whether a processing stage is under-utilized or over-utilized. For one or more under-utilized or over-utilized processing stages, the monitoring & resource allocation module 141 may modify the processing power or allocation of hardware resources for those processing stages. As an example, the monitoring & resource allocation module 141 may decrease the processing power or allocation of hardware resources for an under-utilized processing stage, perhaps by decreasing the number of processing threads or instances allocated for the under-utilized processing stage. On the other hand, the monitoring & resource allocation module 141 may increase the processing power or allocation of hardware resources for an under-utilized processing stage, perhaps by decreasing the number of processing threads or instances allocated for the under-utilized processing stage.

It will be appreciated that the number of processing threads indicates an amount of time or processing power of one or more processors 126a-n allocated for the processes with a particular processing stage. Thus, an increase in the number of processing threads may shorten an amount of time needed by a particular processing stage to process a request (i.e., event) since additional processing power is being utilized to perform the processes of the processing stage. Similarly, a decrease in the number of processing threads can lengthen an amount of time needed by a particular processing stage to process a request. On the other hand, an instance of a processing stage may be a replication or clone of an entire process of a processing stage, where each instance has a respective processing power or hardware resource allocation. Thus, an increase in the number of instances of a processing stage may allow for additional requests to processed simultaneously by a respective instance of the processing stage. It will be appreciated that both the processing threads and processing instances may also both be adjusted when increasing or decreasing a hardware resource allocation without departing from example embodiments of the invention. It will be appreciated that at least a portion of the operations of the monitoring & resource allocation module 141 may also be performed by a monitoring computer 125, according to an example embodiment of the invention.

The external service computer 106a-n may be any entity with which the service provider system 104 communicates transactions requests for processing, and from which one or more responses that indicate a result of the processing may be received, according to an example embodiment of the invention. In an example embodiment of the invention, the transaction requests may be associated with healthcare transactions such as eligibility requests, preauthorization requests, claim status requests, and the like. For healthcare transactions, the external service computer 106a-n may be associated with or operated by a claims processor, an insurance company, a pharmacy benefits manager ("PBM"), a government payor, a discount processor, a third-party payor, or the like, according to an example embodiment of the invention.

Figure 1D:
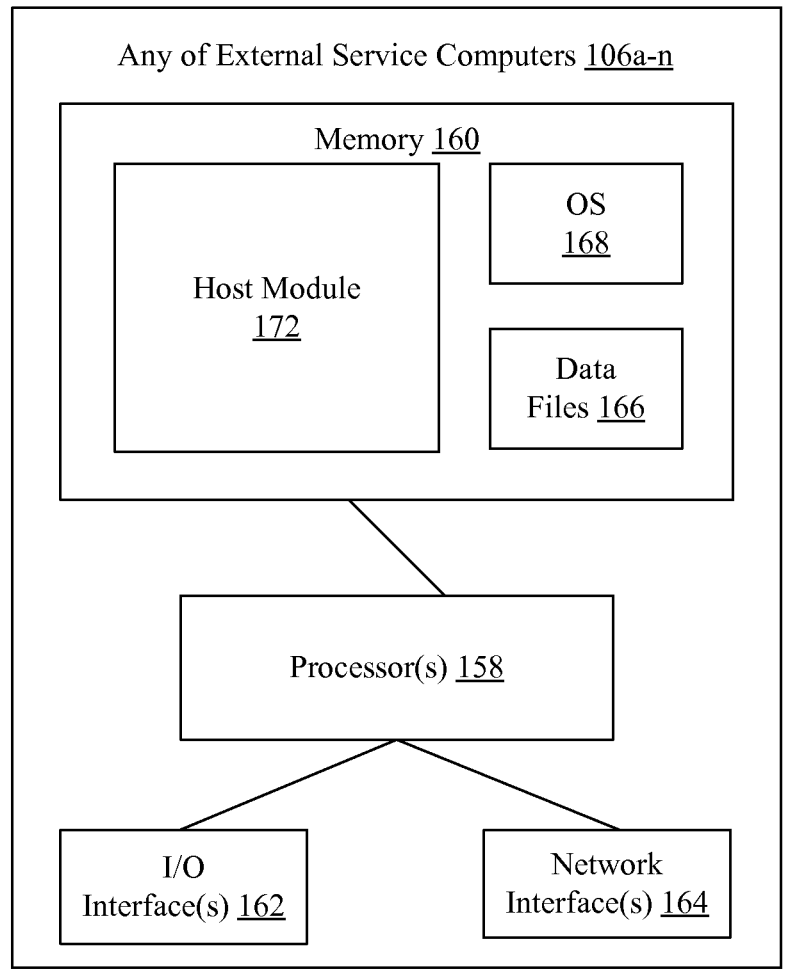
FIG. 1D illustrates an example implementation of an external service computer, according to an example embodiment of the invention.

FIG. 1D illustrates an example implementation of an external service computer 106a-n, according to an example embodiment of the invention. The external service computer 106a-n may be any processor-driven device, such as, but not limited to, a server computer, a mainframe computer, one or more networked computers, a desktop computer, a personal computer, a laptop computer, a mobile computer, a handheld portable computer, a digital assistant, a personal digital assistant, a digital tablet, an Internet appliance, or any other processor-based device. The external service computer 106a-n may include processor(s) 158, at least one memory 160, input/output ("I/O") interface(s) 162, and network interface(s) 164. The memory 160 may be any computer-readable medium, coupled to the processor 158, such as RAM, ROM, and/or a removable storage device for storing data files 166 and a database management system ("DBMS") to facilitate management of data files 166 and other data stored in the memory 160 and/or stored in separate databases. The memory 160 may also store various program modules, such as an operating system ("OS") 168 and a host module 172. The OS 168 may be, but is not limited to, Microsoft Windows®, Apple OSX™, Linux, Unix, or a mainframe operating system. The host module 172 may receive, process, and respond to healthcare transaction requests from the service provider system 104 (e.g., a processing computer 105a-n) or external event source computer 102a-n, respectively.

According to an example embodiment of the invention, the external service computer 106a-n may receive and process healthcare transaction requests such as eligibility requests, preauthorization requests, claim status requests, and the like. Thus, according to an example embodiment, the external service computer 106a-n may be associated with a claims processor, an insurance company, a pharmacy benefits manger (PBM), a discount program, a government payor, or another third-party payor. According to an alternative example embodiment of the invention, an external service computer 106a-n may also be implemented as part of a service provider system 104 or may otherwise be affiliated with the service provider system 104.

Each of networks 110, 130 may include any telecommunication and/or data network, whether public, private, or a combination thereof, including a local area network, a wide area network, an intranet, an internet, the Internet, intermediate hand-held data transfer devices, a publicly switched telephone network (PSTN), and/or any combination thereof and may be wired and/or wireless. The network 110 may also allow for real-time or near real-time transactions and responses to be transmitted between an external event source computer 102a-n and the service provider system 104. Similarly, the network 130 may allow for real-time or near real-time transactions to be transactions and responses to be transmitted between an external service computer 106a-n and the service provider system 104. Due to network connectivity, various methodologies as described herein may be practiced in the context of distributed computing environments.

Those of ordinary skill in the art will appreciate that the system 100 shown in and described with respect to FIG. 1 is provided by way of example only. Numerous other operating environments, system architectures, and device configurations are possible. Accordingly, embodiments of the invention should not be construed as being limited to any particular operating environment, system architecture, or device configuration.

Operational Overview

Figure 2:
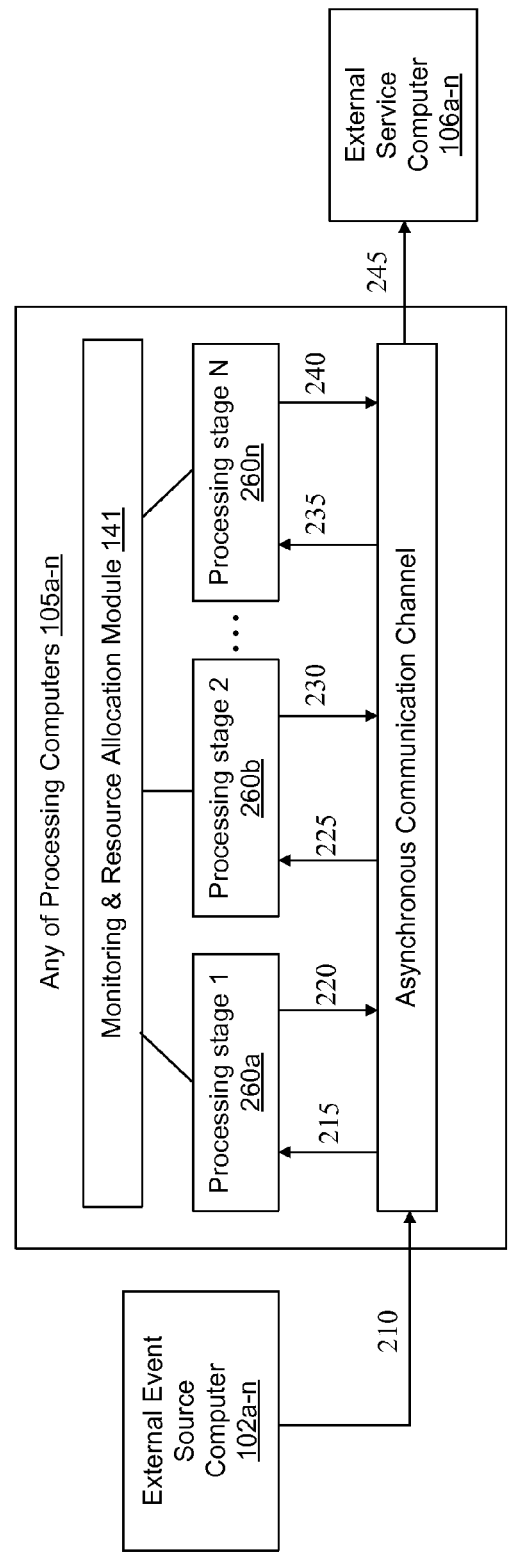
FIG. 2 illustrates an example operation of a processing computer to provide a respective, real-time event driven system, according to an example embodiment of the invention.

FIG. 2 illustrates an example operation of a processing computer 105a-n to provide a respective, real-time event driven system, according to an example embodiment of the invention. As shown in FIG. 2, an external event source computer 102a-n can include N number of processing stages denoted as processing stages 206a-n. The processing stages 206a-n may be arranged in one or more sequential orders such that later processing stage performs processing based upon a result of processing from an earlier stage. An asynchronous communication channel 265 may be utilized to control, direct, synchronize the flow of events or requests through the plurality of processing stages 206a-n. In this regard, the asynchronous communication channel 265 may provide a respective request queue for each processing stage. As such, a processing stage 206a-n can retrieve the next transaction request or event for processing from its request queue, and deliver its result of processing the request to the request queue of the next processing stage 206a-n. The delivery of a request to the request queue of the next processing stage 206a-n may be an event that triggers a request for processing by the next processing stage 206a-n. Optionally, the synchronous communication channel 265 may provide an output queue for one or more processing stages 206a-n to receive a result of the processing of the corresponding processing stage 206a-n. If output queues are utilized, then the asynchronous communications channel 265 may obtain results of processing from an output queue of a processing stage 206a-n and deliver the results to a request queue of a subsequent processing stage 206a-n.

Turning more particularly to FIG. 2, an external event source computer 106a-n may deliver a transaction request 210 to a service provider system 104, which may utilize load-balancing to deliver the transaction request 210 to a particular processing computer 105a-n for processing. When the transaction request 210 is received by the processing computer 105a-n, the asynchronous communication channel may deliver the transaction request 210 to the request queue of the first processing stage 260a. The delivery of the transaction request 210 to the request queue will trigger an event or request for processing by the first processing stage 260a; however, the request 210 will be processed by the first processing stage 260a in turn based upon its position in the request queue.

When the first processing stage 260a finishes its current processing (of another transaction request), it will retrieve the next transaction request 215 (which can be the same as or different than the delivered transaction request 210) from its request queue for processing. When the first processing stage 260a finishes processing the transaction request 215, the result of the processing will be delivered as a transaction request 220 to the asynchronous communication channel 265, which will deliver the transaction request 220 to the request queue of the second processing stage 260b. It will be appreciated that the asynchronous communication channel 265 can initially receive the transaction request 220 into the output queue of the first processing stage 260a, and then deliver the transaction request 220 from the output queue of the first processing stage 260a to the request queue of the second processing stage 260b. On the other hand the asynchronous communication channel 265 can deliver the transaction request 220 to the request queue of the second processing stage 260b without a need for an output queue of the first processing stage 260a.

Similarly, when the second processing stage 260b finishes its current processing (of another transaction request), it will retrieve the next transaction request 225 (which can be the same as or different than the delivered transaction request 220) from its request queue for processing. When the second processing stage 260b finishes processing the transaction request 225, the result of the processing will be delivered as a transaction request 230 to the asynchronous communication channel 265, which will deliver the transaction request 230 to the request queue of the next processing stage (which can be the last processing stage 260n if there are no intervening processing stages between the second processing stage 260b and the Nth processing stage 260n). It will be appreciated that the asynchronous communication channel 265 can initially receive the transaction request 230 into the output queue of the second processing stage 260b, and then deliver the transaction request 230 from the output queue of the second processing stage 260b to the request queue of the next processing stage. On the other hand the asynchronous communication channel 265 can deliver the transaction request 230 to the request queue of the next processing stage without a need for an output queue of the second processing stage 260b.

It will be appreciated that any number of processing stages may be present between the second processing stage 260b and the Nth processing stage 260n, and the processing involving retrieving requests from the request queue, and delivering the result of the processing to the next processing stage may be similar to the processed described above with respect to the first and second processing stages 260a, 260b.

Referring now to the Nth processing stage 260n, when the Nth processing stage 260n finishes its current processing (of another transaction request), it will retrieve the next transaction request 235 from its request queue for processing. When the Nth processing stage 260n finishes processing the transaction request 235, the result of the processing will be delivered as a transaction request 240 to the asynchronous communication channel 265, which will deliver the transaction request 235 to an external service computer 106a-n. It will be appreciated that the asynchronous communication channel 265 can initially receive the transaction request 230 into the output queue of the Nth processing stage 260n. The processing computer 105a-n can then deliver the transaction request 240 from the output queue of the Nth processing stage 260n to external service computer 106a-n. On the other hand, the processing computer 105a-n can deliver the transaction request 240 directly to an external service computer 106a-n without the need for an output queue.

By way of example, first processing stage 260a may perform processing to interface with a external event source computer 102a-n. For example, the first processing stage 260a may perform normalization or conversions of data necessary for use in processing by subsequent stages. Similarly, the Nth processing stage may perform processing to interface with an external service computer 106a-n. For example, the Nth processing stage may perform normalization or conversions of data necessary for use in communications with a particular external service computer 106a-n. The second processing stage 260b and/or any other processing stages between the first processing stage 260 and the Nth processing stage 260n may perform core processing, which may include edit tools, validations, checks, and the like.

It will be appreciated that the processing computer 105a-n can communicate with the external service computer 106a-n using synchronous or asynchronous communications, depending upon the respective configuration of the external service provider computer 106a-n. Example synchronous communications can be utilized with one or more external service computers 106a-n configured to communicate through web services, file transfer protocol, etc. It will be appreciated that for synchronous communication, a communication channel can be maintained between the service provider system 104 and the external service computer 106a until the external service computer 106a-n provides a transaction response, or until a time-out occurs (e.g., a predetermined time such as 60 seconds without receiving the transaction response). The transaction response may indicate a result of the external service computer 106a-n processing the transaction request 245. On the other hand, example, asynchronous communications can be utilized with one or more external service computers 106a-n configured to utilized queues or tickets, according to an example embodiment of the invention. For example, if the external service computer 106a-n utilizes a queue, then the transaction request 245 will be delivered in the queue, and will be processed in turn by the external service computer 106a-n. The external service computer 106a-n may then deliver the transaction response in due course to the processing computer 105a-n. Similarly, a ticket number may have been assigned when the transaction request 245 was delivered to the external service computer 106a-n, and the processing computer 105a-n may return at a subsequent time to obtain the result of processing the transaction request 245 using the ticket number. Many variations of the synchronous and asynchronous communications are available without departing from example embodiments of the invention.

It will be appreciated that when a transaction response is received by a processing computer 105a-n from an external service computer 106a-n, it may trigger an event for a set of processing stages of the external service computer 106a-n, as similarly described with respect to processing stages 260a-n. Once the transaction request has been processed according the plurality of processing stages, the processing computer 105a-n may deliver the transaction response, as processed by any processing stages, to the external event source computer 102a-n via synchronous or asynchronous communications, according to an example embodiment of the invention.

Likewise, the number N of processing stages 260a-n may vary from one time period to another time period. Likewise, the logic processing of each processing stage 260a-n may be modified, and therefore increase or decrease in complexity from one time period to another. In this way, as each of processing stages 260a-n are processing requests from their respective request queues, it is probable that the length of request queues of processing stages 260a-n may vary during operation since the processing stages 260a-n may have differing processing times.

FIG. 2 further illustrates a monitoring & resource allocation module 141 that monitors the processing power or hardware resource utilization (e.g., request queue length, processor utilization, and/or memory utilization) of one or more of the processing stages 260a-n. Based at least in part on the monitored processing power or hardware resource utilization, the monitoring & resource allocation module 141 may determine whether a processing stage 260a-n is under-utilized or over-utilized. For one or more under-utilized or over-utilized processing stages, the monitoring & resource allocation module 141 may modify the processing power or allocation of hardware resources for those processing stages. As an example, the monitoring & resource allocation module 141 may decrease the processing power or allocation of hardware resources for an under-utilized processing stage, perhaps by decreasing the number of processing threads or instances allocated for the under-utilized processing stage. On the other hand, the monitoring & resource allocation module 141 may increase the processing power or allocation of hardware resources for an under-utilized processing stage, perhaps by decreasing the number of processing threads or instances allocated for the under-utilized processing stage.

Figure 3:
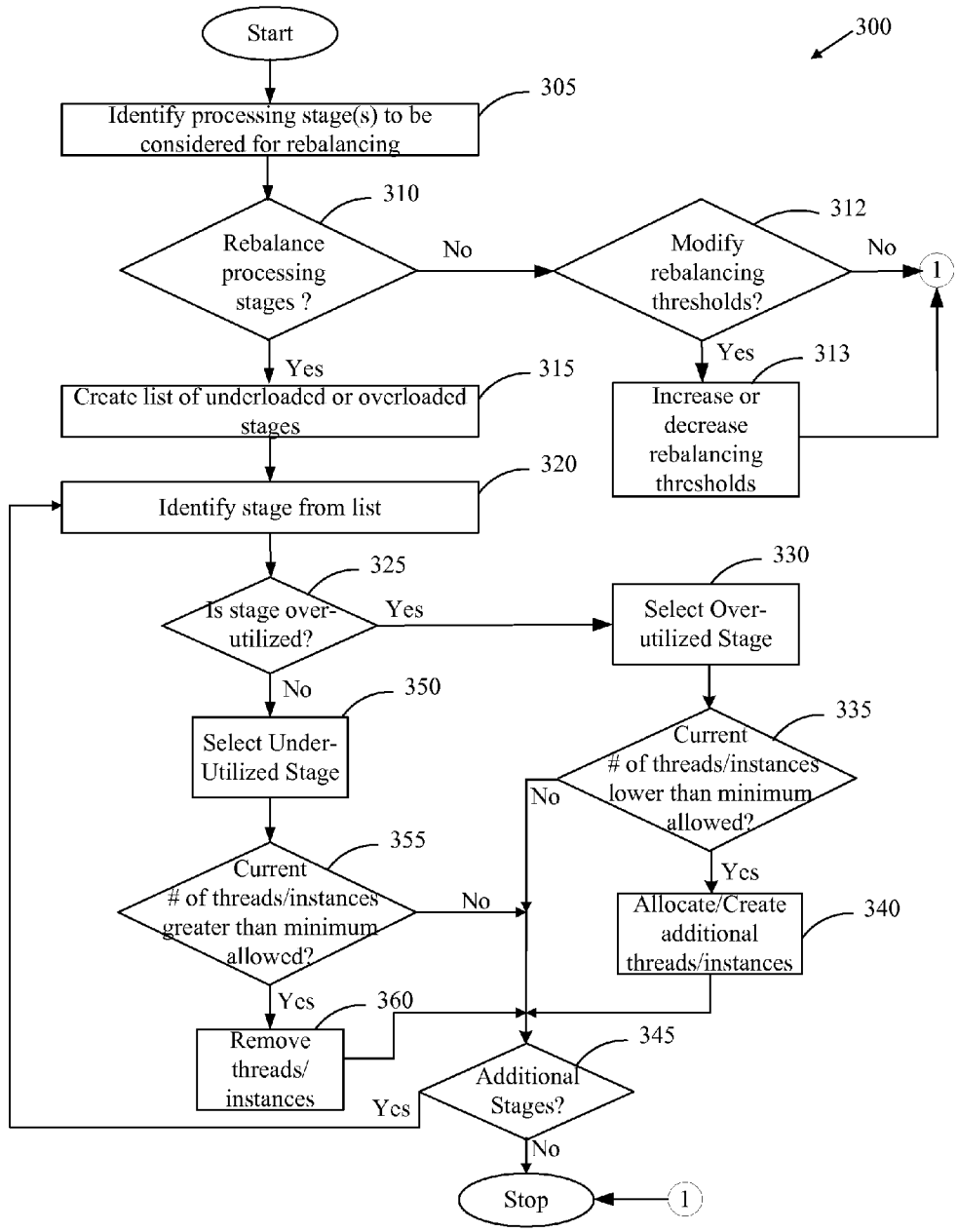
FIG. 3 illustrates an example flow diagram of an example process for auto-balancing throughput in an event-driven system, according to an example embodiment of the invention.

FIG. 3 illustrates an example flow diagram of an example process 300 for auto-balancing throughput in an event-driven system, according to an example embodiment of the invention. The example process 300 may be utilized by the monitoring & resource allocation module 141 (or alternatively, by the monitoring computer 125), according to an example embodiment of the invention.

At block 305, the monitoring & resource allocation module 141 may identify the processing stages to be considered for rebalancing of processing power or allocated hardware resources, according to an example embodiment of the invention. In some example embodiments, all of the processing stages (e.g., processing stages 260a-n) may be considered for rebalancing. However, in some example embodiments, only a portion of the processing stages may be considered for rebalancing, according to an example embodiment of the invention.

Following block 305 is decision block 310. At block 310, the monitoring & resource allocation module 141 may determine whether one or more criteria for auto-balancing processing stages may be met. Example criteria may include any of the following: (i) whether at least one processing stage has a hardware resource utilization (e.g., queue length, processor utilization) that is below a lower rebalancing threshold while at least one other processing stage has a hardware resource utilization above the lower rebalancing threshold, or (ii) whether at least one processing stage has hardware resource utilization (e.g., request queue length) that is above a higher rebalancing threshold while at least one other processing stage has a hardware resource utilization below the higher rebalancing threshold. If the example criteria (i) is satisfied, then those processing stages having respective hardware resource utilizations that are below the lower rebalancing threshold may be identified as under-utilized (or under-loaded) processing stages that are to be marked for rebalancing. The lower rebalancing threshold in criteria (i) may set the lower limit for hardware resource utilization for purposes of identifying an under-utilized processing stage. However, criteria (i) may ensure that no processing stages may be identified as under-utilized where all of the processing stages have hardware resource utilizations that are below the lower rebalancing threshold, which may occur during slow periods when a processing computer 105a-n is simply not receiving many transaction requests from external event source computers 102a-n.

On the other hand, if criteria (ii) is satisfied, then those process stages having respective hardware resource utilizations (e.g., request queue length) that are above the higher rebalancing threshold may be identified as over-utilized (or overloaded) processing stages that are marked for rebalancing. The higher rebalancing threshold in criteria (ii) may set the upper limit for hardware resource utilization for purposes of identifying an under-utilized processing stage. However, criteria (ii) may ensure that no processing stages may be identified as over-utilized where all of the processing stages have hardware resource utilizations that are above the upper rebalancing threshold, which may occur during busy periods when a processing computer 105a-n is simply receiving a number of transaction requests from external event source computers 102a-n.

Block 310 may also determine that no processing stages have been identified as under-utilized or over-utilized, in which case processing may proceed to block 312. Block 312 may determine whether any of the rebalancing thresholds utilized for block 310 should be adjusted. As an example, block 312 may determine whether the lower rebalancing threshold or the higher rebalancing threshold utilized for block 310 should be adjusted (e.g., increased or decreased). For instance, the lower rebalancing threshold may be decreased where the hardware utilizations of all of the processing stages are below the lower rebalancing threshold, but where the total hardware resource utilization of the particular processing computer 105a-n is above a first minimum system threshold (e.g., 25% total system resource utilization). On the other hand, the lower rebalancing threshold may be increased where the hardware utilizations of all of the processing stages are above the lower rebalancing threshold, but where the total hardware resource utilization of the particular processing computer 105a-n does not exceed a second minimum system threshold (e.g., 40% total resource utilization) greater than the first minimum system threshold. Likewise, the higher rebalancing threshold may be increased where the hardware utilizations of all of the processing stages are above the higher rebalancing threshold, but where the total hardware resource utilization of the processing computer 105a-n is below a first maximum system threshold (e.g., 70% total resource utilization). On the other hand, the higher rebalancing threshold may be decreased where the hardware where the hardware utilizations of all of the processing stages are below the higher rebalancing threshold, but where the total hardware resource utilization of the processing computer 105a-n is above a second maximum system threshold less than the first maximum system threshold (e.g., 50% total resource utilization). Many variations of adjusting the thresholds are available without departing from example embodiments of the invention.

If any rebalancing thresholds are to be modified according to block 312, then processing may proceed to block 313. At block 313, a lower rebalancing threshold may be decreased or increased if block 313 determined that the criteria for modifying the lower rebalancing threshold has been met. However, the lower rebalancing threshold may also be required to have be within a range of a first minimum value and a first maximum value such that the lower rebalancing threshold cannot be reduced below the first minimum value or increased above the first maximum value. Similarly, at block 313, a higher rebalancing threshold may be increased or decreased if block 313 determined that the criteria for modifying the higher rebalancing threshold has been met. However, the higher rebalancing threshold may also be required to have be within a range of a second minimum value and a second maximum value such that the lower rebalancing threshold cannot be reduced below the second minimum value or increased above the second maximum value.

On the other hand, block 310 may determine that the criteria for rebalancing one or more processing stages may be satisfied, and processing may proceed to block 315. At block 315, the over-utilized or under-utilized processing stages that satisfy the criteria of block 310 may be identified. The over-utilized or under-utilized stages can be included on a list, according to an example embodiment of the invention. Following block 320, a stage from the list can be identified. Following block 320 is block 325, which determines whether the identified stage of block 325 is over-utilized. If so, then processing proceeds to block 330, where the over-utilized stage is selected. Block 335 then determines whether the current number of processing threads or processing instances (or other hardware resources) allocated to the selected over-utilized stage is lower than the minimum number allowed. If so, then processing may proceed to block 340 where additional threads/instances (or other hardware resources or processing power) are allocated for the selected over-utilized stage. The number of additional threads/instances that are allocated may be predetermined, or may be determined dynamically based upon available hardware resources, according to an example embodiment of the invention. Following block 340 (or the No condition of block 335), processing may proceed to block 345, where a determination is made as to whether any additional stages are available in the list of over-utilized/under-utilized processing stages, and if, so processing may return to block 320, where the next processing stage in the list may be selected.

Return back to block 325, a determination may also be made that the identified processing stage of block 325 is not over-utilized, which means that the identified processing stage is under-utilized. Accordingly, processing may proceed to block 350, where the under-utilized processing stage is selected. Block 335 then determines whether the current number of processing threads or processing instances (or other hardware resources or processing power) allocated to the selected under-utilized stage is greater than the minimum number allowed. If so, then processing may proceed to block 360 where one or more threads/instances (or other hardware resources) are removed from the allocation for the selected under-utilized stage. The number of threads/instances that are removed from the allocation may be predetermined, or may be determined dynamically based upon available hardware resources, according to an example embodiment of the invention. Following block 360 (or the No of block 355), processing may proceed to block 345, as discussed previously herein.

It will be appreciated that many variations of FIG. 3 are available without departing from example embodiments of the invention.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

It will also be appreciated that each of the I/O interfaces described herein may facilitate communication between a processor and various I/O devices, such as a keyboard, mouse, printer, microphone, speaker, monitor, bar code readers/scanners, RFID readers, and the like. Likewise, each of the network interfaces described herein may take any of a number of forms, such as a network interface card, a modem, a wireless network card, and the like.

It will further be appreciated that while certain computers have been illustrated herein as a single computer or processor, the illustrated computers may actually be comprised of a group of computers or processors, according to an example embodiment of the invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:
   receiving at a real-time event driven system a healthcare transaction request from a healthcare provider computer associated with a healthcare provider, wherein the healthcare transaction request is associated with a system-level event;
   identifying a plurality of processing stages for the real-time event-driven system that receives the system-level event and provides a system-level output,
      wherein each processing stage includes a respective request queue for requests to be processed by the respective processing stage,
      wherein a first of the plurality of processing stages receives the system-level event in its respective request queue,
      wherein a last of the plurality of processing stages provides the system-level output, and
      wherein stages between the first processing stage and the last processing stage are arranged in a sequential order such that a respective output of an earlier processing stage is provided to a respective request queue of a later processing stage;
   determining a respective number of requests in each request queue of the plurality of processing stages;
   comparing the respective determined number of requests to a higher rebalancing threshold amount to determine if the respective determined number of requests is greater than the higher rebalancing threshold amount, wherein a processing stage is considered over-utilized if the determined number of requests for that particular processing stage is greater than the higher balancing threshold amount;
   determining that the number of requests in each request queue for all of the plurality of processing stages is above the higher rebalancing threshold amount; and
   automatically increasing the higher rebalancing threshold amount for the plurality of processing stages,
   wherein the prior steps are performed by executing computer-executable instructions of a module by a computer associated with the event-driven system.

2. The method of claim 1, wherein the system-level output is associated with communicating at least a portion of the information in the healthcare transaction request to a payor computer.

3. The method of claim 2, wherein the communications with the payor computer comprise synchronous communications.

4. The method of claim 1, wherein the healthcare transaction request is one of: (i) an eligibility verification request, (ii) a preauthorization request, or (iii) a claim status request.

5. The method of claim 1, further comprising the steps of:
   comparing the respective determined number of requests to a lower rebalancing threshold amount to determine if the respective determined number of requests is less than the lower rebalancing threshold amount,
      wherein the processing stage is considered under-utilized if the determined number of requests for that particular processing stage is less than the lower rebalancing threshold amount, and
      wherein the lower rebalancing threshold amount is less than the higher rebalancing threshold amount;
   determining that the number of requests in each request queue for all of the plurality of processing stages is above the lower rebalancing threshold amount; and automatically increasing the lower rebalancing threshold amount for the plurality of processing stages based on the determination, wherein the prior steps are performed by executing computer-executable instructions of a module by a computer associated with the event-driven system.

6. The method of claim 5, further comprising the steps of:
determining a total hardware resource utilization level for the real-time event driven system;
comparing the total hardware resource utilization level to a minimum system threshold amount;
determining if the total hardware resource utilization level is less than the minimum system threshold amount; and
increasing the lower rebalancing threshold amount for the plurality of processing stages only if the total hardware resource utilization level is less than the minimum system threshold amount.

7. The method of claim 5, further comprising the steps of:
comparing the lower rebalancing threshold amount to a maximum threshold value for the lower rebalancing threshold amount; and
increasing the lower rebalancing threshold amount for the plurality of processing stages only if the lower rebalancing threshold amount is less than the maximum threshold value for the lower rebalancing threshold amount.

8. The method of claim 1, further comprising the steps of:
comparing the higher rebalancing threshold amount to a maximum threshold value for the higher rebalancing threshold amount; and
increasing the higher rebalancing threshold amount for the plurality of processing stages only if the higher rebalancing threshold amount is less than the maximum threshold value for the higher rebalancing threshold amount.

9. A system, comprising:
at least one memory for storing computer-executable instructions; and
at least one processor in communication with the at least one memory, wherein the at least one processor is configured to execute the computer-executable instructions to:
receive at a real-time event driven system a healthcare transaction request from a healthcare provider computer associated with a healthcare provider, wherein the healthcare transaction request is associated with a system-level event;
identify a plurality of processing stages for the real-time event-driven system that receives the system-level event and provides a system-level output,
wherein each processing stage includes a respective request queue for requests to be processed by the respective processing stage,
wherein a first of the plurality of processing stages receives the system-level event in its respective request queue,
wherein a last of the plurality of processing stages provides the system-level output, and
wherein stages between the first processing stage and the last processing stage are arranged in a sequential order such that a respective output of an earlier processing stage is provided to a respective request queue of a later processing stage;
determine a respective number of requests in each request queue of each of the plurality of processing stages;
compare the respective determined number of requests to a higher rebalancing threshold amount to determine if the respective determined number of requests is greater than the higher rebalancing threshold amount, wherein a processing stage is considered over-utilized if the determined number of requests for that particular processing stage is greater than the higher balancing threshold amount;
determine the number of requests in each request queue for all of the plurality of processing stages is above the higher rebalancing threshold amount; and
increase the higher rebalancing threshold amount for the plurality of processing stages.

10. The system of claim 9, wherein the system-level output is associated with communicating at least a portion of the information in the healthcare transaction request to a payor computer.

11. The system of claim 10, wherein the communications with the payor computer comprise synchronous communications.

12. The system of claim 9, wherein the healthcare transaction request is one of: (i) an eligibility verification request, (ii) a preauthorization request, or (iii) a claim status request.

13. A computer-implemented method, comprising:
receiving at a real-time event driven system a healthcare transaction request from a healthcare provider computer associated with a healthcare provider, wherein the healthcare transaction request is associated with a system-level event;
identifying a plurality of processing stages for the real-time event-driven system that receives the system-level event and provides a system-level output,
wherein each processing stage includes a respective request queue for requests to be processed by the respective processing stage,
wherein a first of the plurality of processing stages receives the system-level event in its respective request queue,
wherein a last of the plurality of processing stages provides the system-level output, and
wherein stages between the first processing stage and the last processing stage are arranged in a sequential order such that a respective output of an earlier processing stage is provided to a respective request queue of a later processing stage;
determining a respective number of requests in each request queue of the plurality of processing stages;
comparing the respective determined number of requests to a higher rebalancing threshold amount to determine if the respective determined number of requests is greater than the higher rebalancing threshold amount, wherein a processing stage is considered over-utilized if the determined number of requests for that particular processing stage is greater than the higher balancing threshold amount;
determining that the number of requests in each request queue for all of the plurality of processing stages is below the higher rebalancing threshold amount; and
automatically decreasing the higher rebalancing threshold amount for the plurality of processing stages,
wherein the prior steps are performed by executing computer-executable instructions of a module by a computer associated with the event-driven system.

14. The method of claim 13, further comprising:
comparing the respective determined number of requests to a lower rebalancing threshold amount to determine if the respective determined number of requests is less than the lower rebalancing threshold amount, wherein the processing stage is considered under-utilized if the determined number of requests for that particular processing stage is less than the lower rebalancing threshold amount;

wherein the lower rebalancing threshold amount is less than the higher rebalancing threshold amount;

determining that the number of requests in the request queue for at least one of the plurality of processing stages is below the lower rebalancing threshold amount; and decreasing an allocation of hardware resources to the respective under-utilized processing stage based on the determination, wherein the prior steps are performed by executing computer-executable instructions of a module by a computer associated with the event-driven system.

15. The method of claim 14, wherein decreasing the allocation of hardware resources includes removing one or more processing threads for the under-utilized processing stage, or removing one or more operating instances of the under-utilized processing stage.

16. The method of claim 14, wherein comparing the respective determined number of requests to the lower rebalancing threshold includes determining that at least one but less than all of at least the respective number of requests for the plurality of processing stages are below the lower rebalancing threshold.

17. The method of claim 14, wherein the hardware resources are associated with at least one of memory resources or processor resources.

18. The method of claim 13, further comprising the steps of:

comparing the respective determined number of requests to a lower rebalancing threshold amount to determine if the respective determined number of requests is less than the lower rebalancing threshold amount, wherein the processing stage is considered under-utilized if the determined number of requests for that particular processing stage is less than the lower rebalancing threshold amount, and wherein the lower rebalancing threshold amount is less than the higher rebalancing threshold amount;

determining that the number of requests in each request queue for all of the plurality of processing stages is below the lower rebalancing threshold amount; and automatically decreasing the lower rebalancing threshold amount for the plurality of processing stages based on the determination, wherein the prior steps are performed by executing computer-executable instructions of a module by a computer associated with the event-driven system.

19. The method of claim 18, further comprising the steps of:

comparing the lower rebalancing threshold amount to a minimum threshold value for the lower rebalancing threshold amount; and decreasing the lower rebalancing threshold amount for the plurality of processing stages only if the lower rebalancing threshold amount is greater than the maximum threshold value for the lower rebalancing threshold amount.

20. The method of claim 13, further comprising the steps of:

comparing the higher rebalancing threshold amount to a minimum threshold value for the higher rebalancing threshold amount; and decreasing the higher rebalancing threshold amount for the plurality of processing stages only if the higher rebalancing threshold amount is greater than the minimum threshold value for the higher rebalancing threshold amount.

* * * * *